United States Patent
Weissbrich et al.

[11] Patent Number: 5,417,624
[45] Date of Patent: May 23, 1995

[54] ACTUATING MEANS FOR A MOTOR VEHICLE LOCKING BRAKE

[75] Inventors: Alfons Weissbrich, Gauting; Simone Ruhr, Braunschweig, both of Germany

[73] Assignee: Volkswagen AG, Wolfsburg, Germany

[21] Appl. No.: 781,210
[22] PCT Filed: Jun. 13, 1990
[86] PCT No.: PCT/EP90/00930
§ 371 Date: Apr. 27, 1992
§ 102(e) Date: Apr. 27, 1992
[87] PCT Pub. No.: WO90/15734
PCT Pub. Date: Dec. 27, 1990

[30] Foreign Application Priority Data
Jun. 20, 1989 [DE] Germany .......... 39 19 994.0
Dec. 22, 1989 [DE] Germany .......... 39 42 539.8

[51] Int. Cl.⁶ ............................... B60K 41/28
[52] U.S. Cl. ............................ 477/71; 477/96; 477/901; 188/2 D
[58] Field of Search .......... 192/0.04, 0.049, 0.09; 188/162, 2 D

[56] References Cited

U.S. PATENT DOCUMENTS

| | | | |
|---|---|---|---|
| 2,867,310 | 1/1959 | Martin | 192/4 C |
| 4,518,067 | 5/1985 | Jow et al. | 192/0.09 |
| 4,561,527 | 12/1985 | Nakamoto et al. | 192/4 C |
| 4,629,043 | 12/1986 | Matsuo | 192/4 A |
| 4,676,354 | 6/1987 | Janiszewski et al. | 192/0.044 |
| 4,771,657 | 9/1988 | Iwatsuki | 74/866 |
| 4,795,002 | 1/1989 | Burgei et al. | 188/2 D |
| 4,821,854 | 4/1989 | Koshizawa | 192/0.072 |
| 4,865,165 | 9/1989 | Taig | 188/156 |
| 5,004,077 | 4/1991 | Carlson et al. | 188/2 D |
| 5,180,038 | 1/1993 | Arnold et al. | 188/171 |

FOREIGN PATENT DOCUMENTS 2035349  1/1972  Germany.
2815018 10/1979  Germany.
3238196  4/1984  Germany.

*Primary Examiner*—Dirk Wright
*Attorney, Agent, or Firm*—Brumbaugh, Graves, Donohue & Raymond

[57] ABSTRACT

An actuating device for a locking brake of a motor vehicle includes a reversible electric motor which drives a threaded spindle with a serrated coarse screw thread through a preferably self-locking gear connection. A spur lever having a spur which engages the screw thread is connected to a force-transmitting member which actuates the tensioning element of the locking brake. The electric motor and threaded spindle turn in one direction to set the locking brake and in the opposite direction to release the locking brake. The actuating device also includes a manually operated handbrake lever which can pivot about an axis spaced from and transverse to the longitudinal direction of the spur lever and the force-transmitting member. When the handbrake lever is pulled, an actuating lever pivotally mounted on the same axis causes the spur lever to pivot toward the brake-locking position.

10 Claims, 2 Drawing Sheets

ACTUATING MEANS FOR A MOTOR VEHICLE LOCKING BRAKE

BACKGROUND OF THE INVENTION

The invention relates to an actuating means for a motor vehicle locking brake.

A locking brake of this kind is disclosed in principle by German Letters of Disclosure 2,035,349. This known locking brake is intended to be capable of automatic engagement and disengagement in any operating mode of the vehicle, such as for example starting, setting in motion, changing gears, clutch action, standing and parking. However, no concrete design or control features are disclosed in that source. It is merely set forth schematically and implicitly that in the train of electrical supply to an electric motor, several electric switches are to be arranged, associated with the ignition, clutch and transmission of the motor vehicle, their conditions depending on the current functional mode ignition on-/ignition off, clutch in/clutch out, and in-gear/neutral, while an additional electric switch, apparently manually actuable, can render the aforementioned electric switches inoperative and control the electric motor directly.

SUMMARY OF THE INVENTION

The object of the invention, then, is to create an actuating means that meets the requirements of practice as to mode of operation and dependability in service, and furthermore affords numerous additional possibilities for control and functional monitoring of the locking brake.

This object is accomplished, according to the invention, by providing a brake actuator having a threaded spindle driven by a reversible electric motor and a brake-actuating lever connected to the brake and having a spur gear engaging the spindle thread, the mechanical linkage between the motor and the lever including a self-locking connection.

BRIEF DESCRIPTION OF THE DRAWINGS

In the drawing, in part schematically and in principle.

DETAILED DESCRIPTION OF PREFERRED EMBODIMENT

Figure 1:
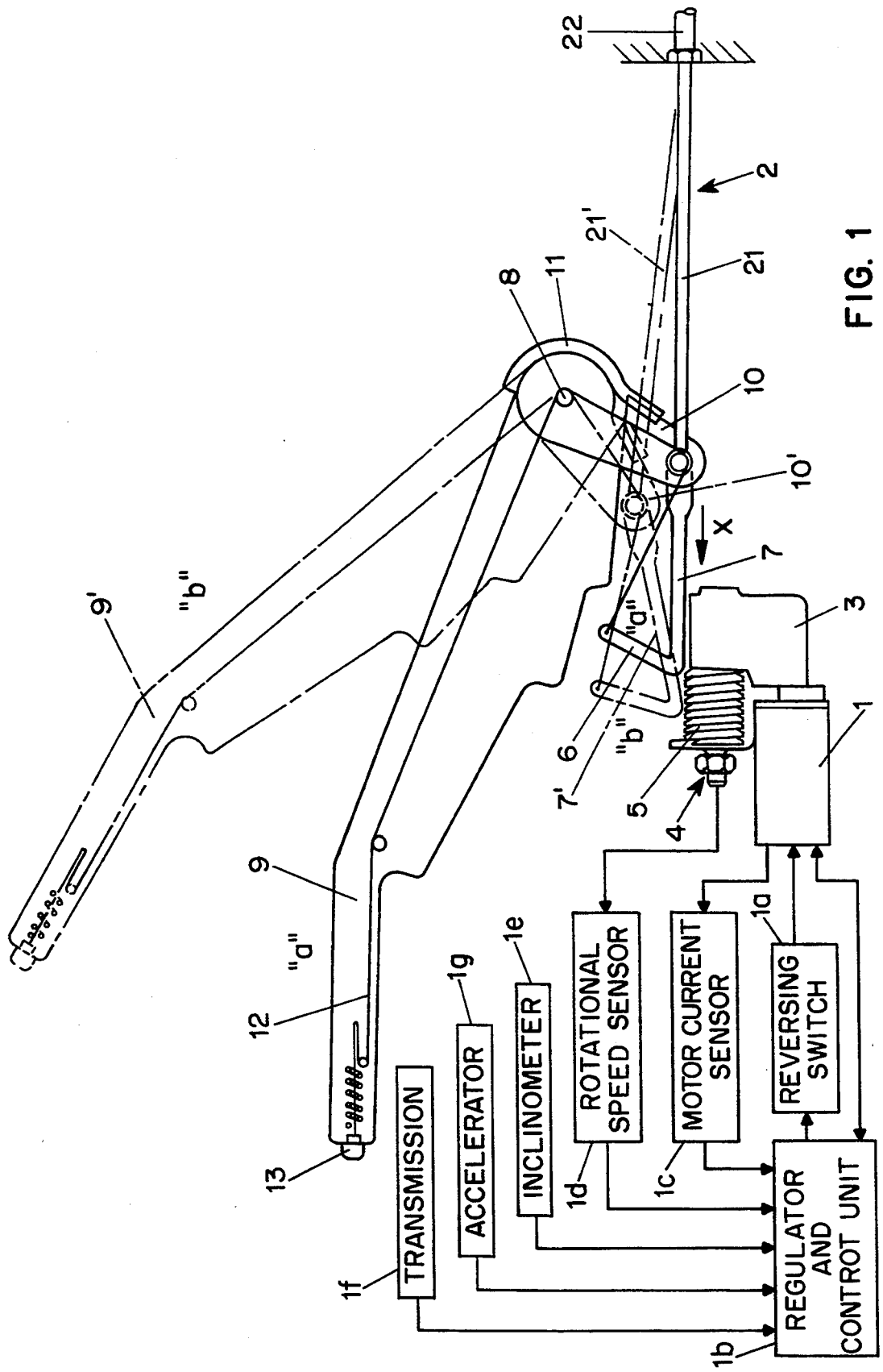
FIG. 1 shows a view of an actuating means according to the invention.

The drawing shows only those details of the actuating means which are necessary for an understanding of the invention.

The actuating means represented by way of example is an apparatus that may be operated purely mechanically in the manner of known hand brake mechanisms, or purely electrically, with no need to execute any switching maneuvers or the like. The apparatus comprises an electric motor 1 driving a threaded spindle 4 whose coarse thread 5 is preferably of serrated configuration.

Figure 2:
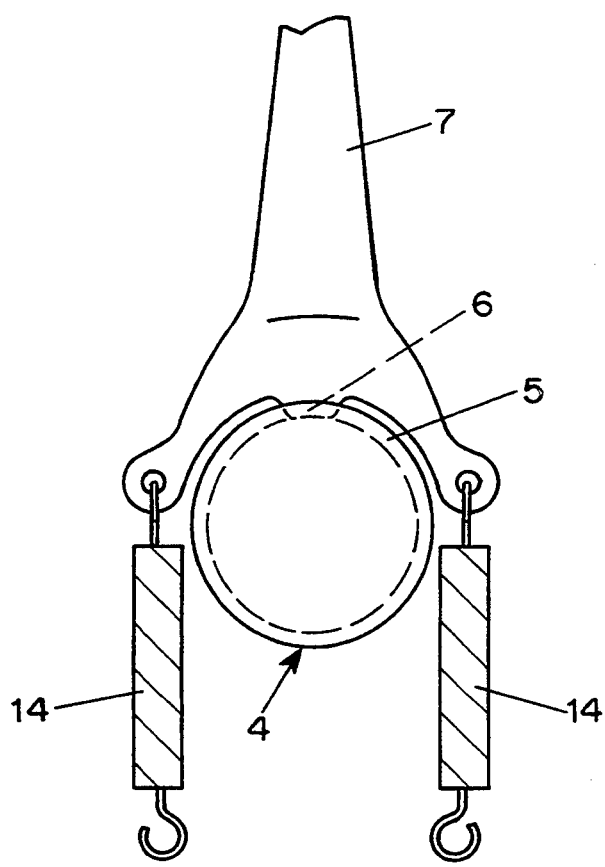
FIG. 2 shows a detail of said actuating means.
Figure 3:
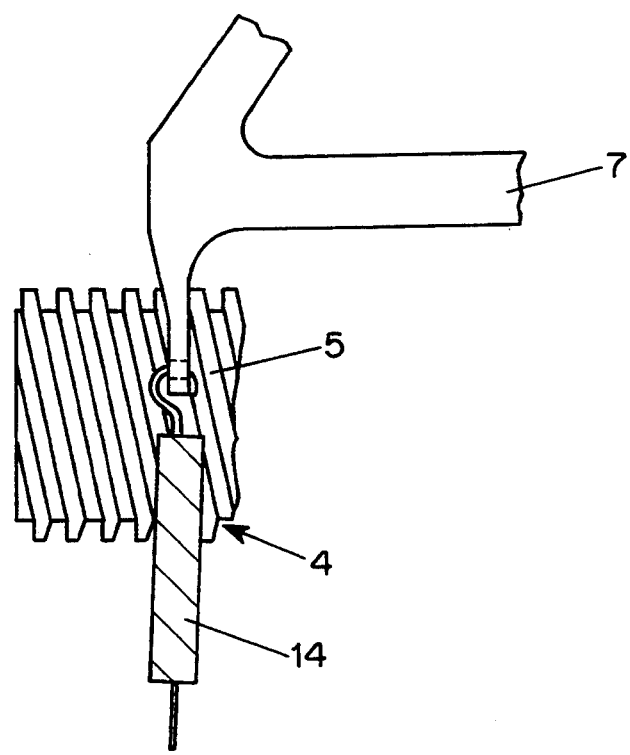
FIG. 3 is an enlarged fragmentary side view illustrating the brake actuator portion of FIG. 2.

The thread 5 is engaged by the spur 6 of a lever 7 urged towards the spindle 4 by spring arrangements 13, as clearly indicated in FIG. 2. The lever 7 in turn is articulated to the motor end of the transmission element 2, in communication with the locking members of the locking brake, not explicitly shown, of the motor vehicle. The transmission element preferably used, as in the embodiment shown by way of example, is a cable in the nature of a Bowden release, whose cable 21 is connected to the lever 7, while its sleeve 22 abuts in conventionally fixed location on the vehicle framework, not shown in detail.

The electric motor 1 used is preferably a known direct-current motor supplied from a battery carried on the vehicle and capable of being switched on and off or in direction of rotation according to prevailing requirements by means of an electric switch 1a and/or an electronic regulating and control means 1b, not shown in detail. Preferably an electric reversing switch is used for this purpose.

For electrically setting and electrically releasing the locking brake, the electric motor 1 is switched in in each instance by actuating the reversing switch 1a, the direction of rotation of the electric motor and hence the direction of rotation of the threaded spindle 4 depending on the direction of actuation of the switch 1a. According to the direction of rotation of the spindle 4, therefore, the lever 7, with its spur 6 engaging the thread of the spindle and the cable 21 of the transmission element 2 acting thereon, is moved in either the one direction or the other axially. To actuate the locking brake, the reversing switch is operated so that the lever 7 is moved out of its fully extended rest position "a" as shown in the direction of the arrow x, for example into position "b," whereby a tension tightening the locking members is transmitted to the locking members of the brake by the cable 21 of the transmission element 2.

As soon as the locking brake has been set, or a desired locking force is attained, the electric motor 1 is shut off, either by releasing the aforesaid reversing switch 1a or else automatically by means of an electronic regulator and control 1b, not shown in detail. The locking force of the brake is fully maintained even though the electric motor is switched off, if the gear 3 and/or the thread 5, or the pair comprising thread 5/spur 6, is of self-locking design; so no retaining forces need be applied by the electric motor 1.

For electrically releasing the set locking brake, the electric motor is switched on again by suitable switch actuation, but in the opposed direction of rotation, so that the lever 7 is moved back again, into the position marked "a" in FIG. 1 at the farthest. The transmission element 2, or cable 21, after elimination of the tension exerted by the lever 7, is likewise retracted in turn to its original position by the conventional restoring springs or the like of the brake.

To switch the electric motor 1 on and off and at the same time determine its direction of rotation as required to set or release the locking brake, as the case may be, preferably a manually actuated electric reversing switch 1a is provided, as aforementioned.

Alternatively, however, an additional electronic regulating and control means 1b may be provided, both to monitor proper function of the apparatus and to control the locking brake in dependency upon operating parameters of the motor vehicle and/or of the electric motor 1.

Advantageously, the electric motor 1 may be switched off automatically, for example by such electronic regulating and control means 1b, when its motor current exceeds a predetermined value, or else when it has no longer been rotated for a certain length of time. For this purpose, of course, suitable known sensors 1c and 1d must be provided, to gauge firstly the motor current and secondly the rotational speed of the motor shaft, the initial values whereof are supplied to the electronic regulating and control means 1b. By varying this motor current limit, it is thus possible in simple manner to adapt to special operating conditions from time to time prevailing. For example with the aid of an inclinometer 1e or the like installed in the vehicle, it will thus be possible to vary the said motor current limit as a function of the up or down grade of the roadway, namely in such manner that the limit is correspondingly increased with the magnitude of the grade or inclination of the roadway. Correspondingly to the increased motor current limit, the electric motor 1 will then be switched off only at a higher motor current, or in other words not until a correspondingly higher locking force is made to act on the locking brake. The vehicle load or the towing of a motor vehicle trailer may be taken into account in simple manner by varying the motor current limit.

It is easily seen that in setting the locking brake, i.e. with lever 7 moving in the direction of the arrow x, brake lining wear or variations in cable length are automatically compensated without loss of brake force.

Conceivably also, the electric motor 1 may simply be switched off in response to axial force upon reaching the position "b" (locking brake set) or that of the stop in position "a" (brake released) as represented in FIG. 1.

In the actuating means according to the invention, using the electronic regulating and control means 1b, the ability of the system to function properly may also be monitored continuously in very simple manner. When the electronic regulating and control means 1b is notified, for example by signals from current and speed sensors 1c and 1d, that firstly the motor current is too high and secondly too few motor revolutions, or too few spindle revolutions, are being executed, then the electronic regulating and control means 1b, with the aid of the logic components it contains, for example microprocessors or the like, will conclude from these data that the locking brake is apparently jammed, for example rusted or frozen.

Correspondingly, the electronic regulating and control means 1b, when firstly the motor current ceases to rise and secondly too many motor or spindle revolutions are detected, will diagnose in simple manner that the transmission element 2 has failed, or else, for example due to cable stretch, become too long. The electrically operated locking brake actuation means according to the invention may also advantageously be coupled to a conventional theft alarm system, for example in such a manner that the locking brake will be automatically set when an alarm has been triggered.

Using the electronic regulating and control means, it is possible also to achieve an "automatic actuation of locking brake when standing on a slope" function or an "automatic actuation of locking brake when vehicle stationary" function, for which purpose in principle it is necessary only with the aid of suitable sensor means to detect the standstill of the vehicle and—in the former case—the inclination of the roadway, and supply the sensor signals to the automatic regulating and control means. Especially for motor vehicles with automatic transmission, such automatic setting of the locking brake when in gear, for example stopping for a light, will definitely contribute to comfort. If this function of automatic actuation of the locking brake is not to be operative in general, but only at the will of the driver, then it is possible in simple manner to activate this function by way of an AUTO switch integrated with the electric reversing switch provided for actuation of the electric motor 1. This function may then be indicated to the operator by a light-emitting diode or the like.

Using the electronic regulating and control means, it is of course possible also in simple manner to automatically release the electrically set locking brake, for example, in the case of motor vehicles with automatic transmission, when the engine is running, the automatic transmission 1f is in gear, and the accelerator 1a is actuated. In motor vehicles with manually actuated transmission 1f, the automatic release of the electrically set locking brake may for example take place when the engine is running, the transmission 1f is in gear, the gas pedal is actuated, and the clutch is engaged to a certain extent by corresponding actuation of the clutch pedal.

As is known, overbraking of the rear axle of a motor vehicle will in principle lead to an unstable condition. Using the electronic regulating and control means, then, it is possible in simple manner, when a certain road speed threshold is exceeded, for example one of about 20 kilometers per hour, to permit an electrical actuation of the locking brake only when the driver quite deliberately operates the electric reversing switch 1a for actuation of the electric motor 1; this means that the electric motor 1 will automatically be reversed into the direction of releasing the locking brake as soon as the reversing switch is released once more.

The electric motor driven actuating means for a motor vehicle locking brake as above described may by very simple design means be modified so that if necessary, or at will, it may be actuated manually by means of a conventional pivoted hand brake lever, as is the case in the embodiment shown by way of example in FIG. 1.

In this arrangement, the hand brake lever 9 is pivotably articulated to the frame of the vehicle about an axis 8 at a distance from and transverse to the lengthwise extent of the lever 7 and transmission element 2, and as a rule transverse to the longitudinal axis of the vehicle as well. About the same axis 8, a substantially shorter actuating lever 10, compared to the hand brake lever 9, may also be pivoted, its free end being articulated to the motor end of the transmission element 2, i.e. of the cable 21, in common with the lever 7. The hand brake lever 9 and actuating lever 10 are not rigidly connected, i.e. they are in principle pivotable relative to each other.

On the hand brake lever 9, however, a follower mechanism is arranged, namely a follower 11, which loosely embraces the actuating lever 10 from behind in its rest position (solid lines in FIG. 1) when the hand brake lever 9 is in its stand-by or rest position "a."

When the hand brake lever is put in the usual manner out of its rest position "a" for manual actuation of the locking brake, i.e. swung about its pivot 8, then the follower 11 forces the actuating lever 10 to rotate about the pivot 8 likewise, thrusting the lever 7 in the direction of the arrow x; the spur 6 of the lever then slips over the thread of the spindle 4, stationary because of its self-locking feature. The serrated configuration of the thread advantageously facilitates the "skipping" of the threads by the spur 6 in the direction of the arrow x in the first place, and brings it about that the spring means 13 need exert only slight radial engaging forces to ensure that the retaining forces of the transmission element 2, acting contrary to the direction of the arrow x when the locking brake is set, will be dependably taken up by the thread 5 of the spindle 4.

In FIG. 1, the positions assumed by the hand brake lever, the actuating lever and the spur lever are indicated in dot-dashed lines and marked 9', 10' and 7' respectively. When the hand brake lever has been swung far enough to achieve the required or desired retaining force of the locking brake, the spur lever 7', the actuating lever 10' and the cable 21' retain the positions they occupy by reason of the dynamic and geometric interlock between spur 6 and thread 5 and by reason of the self-locking design of the gear 3 and the thread etc. The hand brake lever itself may at the same time if desired—being coupled to the actuating lever 10 only by its follower 11—be "put away" again in its rest position "a." It is easily seen that the hand brake lever 9 will therefore remain in its rest position "a" as shown in the case of purely electrical actuation of the locking brake. Thus in purely electrical actuation of the locking brake, the hand brake lever will not by any means swing automatically, thus possibly annoying the driver. For mechanical release of the locking brake, a mechanism is provided in the hand brake lever 9, in the embodiment shown by way of example a cable mechanism 12 actuable by means of a pushbutton 13, whereby the spur 6 of lever 7 can be disengaged from the thread 5 of the spindle 4 against the force of the spring means 13 and against the action of the frictional or locking forces there prevailing, thus releasing the geometric and dynamic interlock between spindle 4 and lever 7, and allowing the transmission element 2 and the actuating lever 10 and spur lever 7 to return into their basic position under the influence of the cable forces acting against the direction of the arrow x.

The mechanical release of the locking brake may take place equally with hand brake lever 9 or 9' in rest position "a" or in locking position "b." With hand brake lever 9 and follower 11 in rest position, release of the locking brake is very rapid, abrupt as it were, since after disengagement of the spur 6 from the thread 5, the actuating lever can return from its position marked 10' to its rest position marked 10 quite unhindered.

If instead the release of the locking brake takes place with hand brake lever 9' drawn up, i.e. in position "b," the locking brake may alternatively be released in customary manner more slowly and well under control; for in that case, the follower 11 of the hand brake lever is in contact with the disengaged actuating lever 10'.

We claim:

1. An actuator for a motor vehicle locking brake comprising a reversible electric motor, a threaded spindle driven by the electric motor, a spur lever connected to one end of a force-transmitting member leading to a brake, and a spur on the spur lever for directly engaging the thread of the spindle, the drive connection between the electric motor and the spur lever including a self-locking connection.

2. An actuator according to claim 1, including an electric reversing switch for switching the electric motor on and off and at the same time selecting its direction of rotation as required to set or release the locking brake.

3. An actuator according to claim 1, including electronic regulating and control means responsive to at least one operating parameter of the motor vehicle or of the electric motor for functional monitoring and/or control of the locking brake.

4. An actuator according to claim 3 wherein the electronic regulating and control means includes means for automatically setting the locking brake when the motor vehicle is stopped on an incline.

5. An actuator according to claim 3 wherein the electronic regulating and control means includes means for automatically setting the locking brake when the vehicle is stationary.

6. An actuator according to claim 4 or claim 5 wherein the vehicle has an automatic transmission and wherein the electronic regulating and control means includes means for automatic release of the locking brake as soon as the automatic transmission is put in gear and the accelerator actuated with the engine running.

7. An actuator according to claim 4 or claim 5 wherein the vehicle has a manual transmission and wherein the electronic regulating and control means includes means for automatic release of the locking brake as soon as the manual transmission is put in gear, the gas pedal is actuated, and the clutch is engaged to a certain extent by appropriate actuation of the clutch pedal with the engine running.

8. An actuator according to claim 3 wherein the electronic regulating and control means includes means for automatic release of the locking brake when a preassigned road speed is exceeded and the electric reversing switch is not held in a position causing the locking brake to be set.

9. An actuator according to claim 1, including a handbrake lever pivotable about an axis spaced from and transverse to the lengthwise extent of the spur lever and of the force-transmitting member, a pivotably supported actuating lever substantially shorter than the handbrake lever, connected together with the spur lever to the one end of the force-transmitting member, a follower mechanism on the handbrake lever loosely embracing the actuating lever and acting in one direction only, whereby swinging motion of the handbrake lever only in the direction to set the locking brake can be transmitted to the actuating lever.

10. An actuator according to claim 9, including a release mechanism arranged in the handbrake lever for disengaging the spur from the thread of the spindle.

* * * * *